United States Patent [19]
Thompson

[11] 4,081,172
[45] Mar. 28, 1978

[54] FLUID VALVE
[75] Inventor: William S. Thompson, Elkhart, Ind.
[73] Assignee: Elkhart Brass Mfg. Co., Inc., Elkhart, Ind.
[21] Appl. No.: 730,168
[22] Filed: Oct. 7, 1976
[51] Int. Cl.² .............................................. F16k 35/00
[52] U.S. Cl. ........................................ 251/93; 251/288
[58] Field of Search ................... 137/315; 251/89, 90, 251/93, 101, 304, 308, 309, 284, 286, 287, 314, 315, 288

[56] References Cited
U.S. PATENT DOCUMENTS

| | | | |
|---|---|---|---|
| 1,053,763 | 2/1913 | Watson | 251/288 |
| 1,973,418 | 9/1934 | Sibley | 251/286 |
| 2,665,879 | 1/1954 | Housekeeper et al. | 251/315 |
| 2,741,138 | 4/1956 | Russell | 251/315 |
| 2,916,254 | 12/1959 | Wendell | 251/315 |
| 3,061,267 | 10/1962 | Hamer | 251/288 |
| 3,198,477 | 8/1965 | Allenbaugh, Jr. | 251/286 |
| 3,929,317 | 12/1975 | Cohn et al. | 251/288 |

FOREIGN PATENT DOCUMENTS

| | | | |
|---|---|---|---|
| 503,693 | 6/1954 | Canada | 251/288 |
| 19,570 of | 1915 | United Kingdom | 251/288 |

*Primary Examiner*—Martin P. Schwadron
*Assistant Examiner*—G. L. Walton
*Attorney, Agent, or Firm*—Oltsch & Knoblock

[57] ABSTRACT

A fluid valve having a housing with an inlet and outlet. A valve closure is carried between the inlet and outlet by a stem journaled within the housing. A handle which is rotative relative to the stem and which is utilized to rotate the valve closure is provided. A lock member is carried by the valve housing and is contacted by the handle which, upon rotation, causes the lock member to rotate with the handle relative to the valve housing. A connector extends between the valve stem and the lock member so that, upon movement of the lock member, the connector causes the valve stem to rotate, thus rotating the valve closure within the valve housing.

9 Claims, 12 Drawing Figures

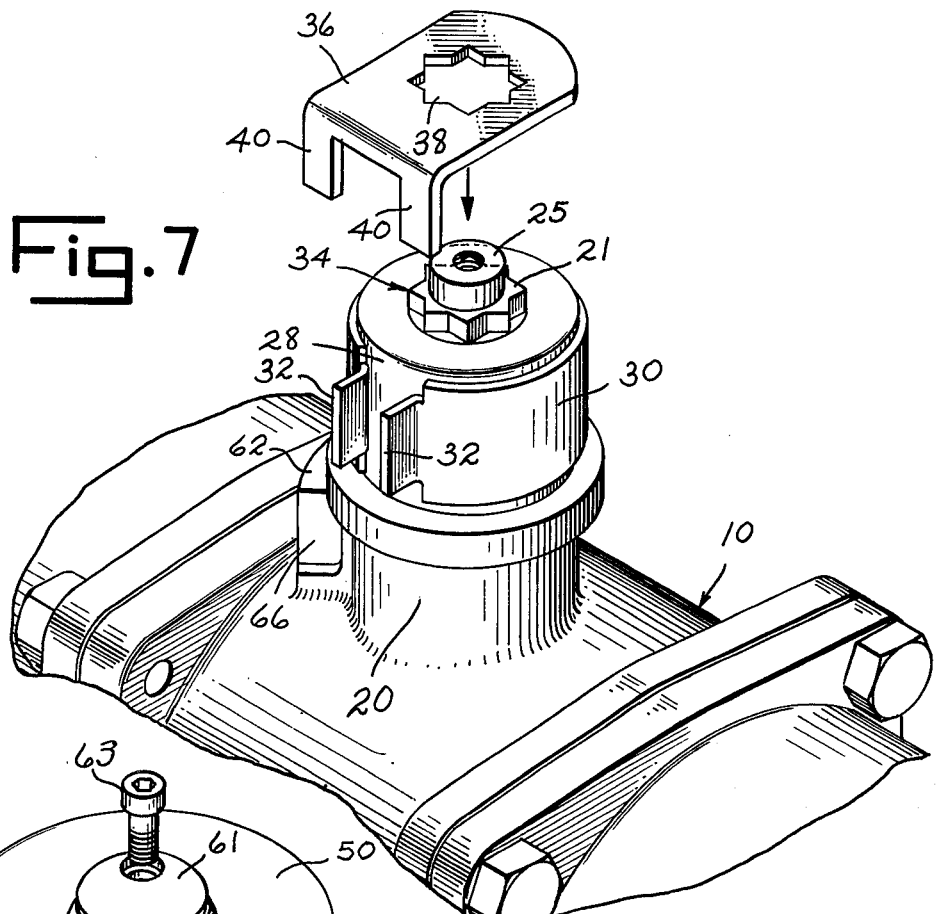
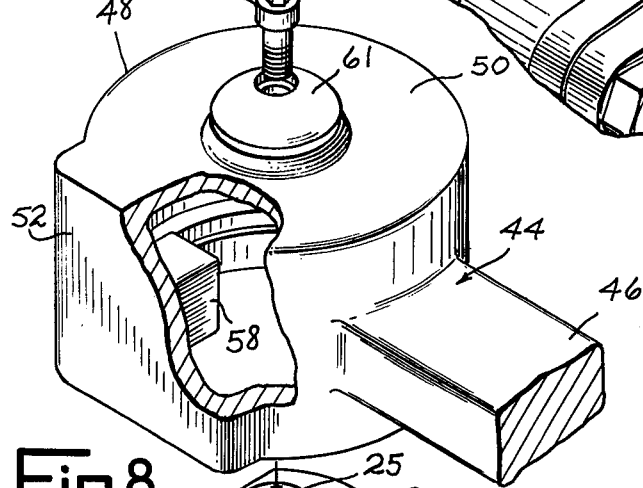
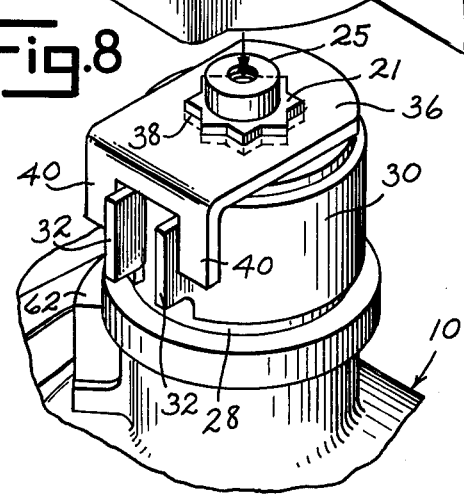
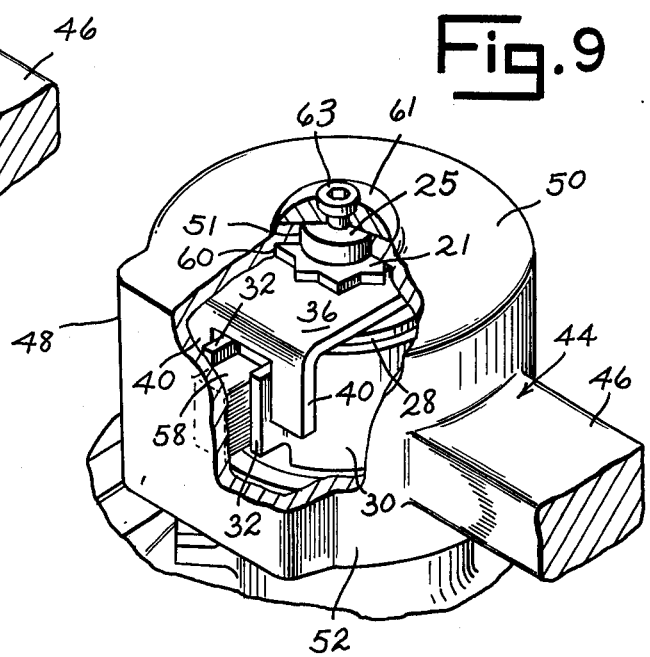

FLUID VALVE

SUMMARY OF THE INVENTION

This invention relates to a fluid valve which will have specific but not limited application to water control valves used in firefighting apparatus.

In the valve of this invention a shiftable valve closure connected to a stem is positioned within the valve housing between its inlet and outlet. A handle for shifting the valve closure is provided and is rotatable relative to the valve stem. A locking member which engages the valve housing and which contacts the valve handle and a cooperating connector which is secured to the valve stem serves to shift the valve closure between open and closed positions as the handle is rotated. The novel cooperating locking member and connector, while allowing handle rotation to selectively position the valve closure, prevent flow induced movement of the valve closure due to the force exerted upon it by the fluid as it passes through the valve. Heretofore ball and other similar type valves with rotating valve closures have been subject to the problem of their valve closures being shifted from preset positions due to the force of the fluid flow through the valves. This was an especially acute problem when the valves were used to supply water to fire hoses, and because of this change in valve closure positions the water discharge rates from the hose were undesirably varied.

Accordingly, it is an object of this invention to provide a fluid valve which has a valve element or closure shiftable between open and closed positions and which includes means allowing the valve element or closure to be moved by a handle but preventing such movement by the force of fluid flow through the valve.

Another object of this invention is to provide a fluid valve having a selectively positionable valve closure which is not affected in position by fluid flow through the valve.

Still another object of this invention is to provide a ball or similar type fluid valve in which the ball element is locked against rotation caused by fluid flow through the valve when the ball is in an intermediate open position.

And still another object of this invention is to provide a reliable fluid valve which has a rotative valve closure and which is of economical construction.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 7 is a perspective view of a portion of the valve housing shown with the valve handle removed and with a connector part displaced for purposes of illustration.

FIG. 8 is a fragmentary perspective view of the valve housing showing the valve handle displaced.

FIG. 9 is a fragmentary perspective view of the valve housing showing the valve handle carried by the housing.

DESCRIPTION OF THE PREFERRED EMBODIMENT

The preferred embodiment illustrated is not intended to be exhaustive or to limit the invention to the precise form disclosed. It has been chosen and described in order to best explain the invention and its application and practical use to thereby enable others skilled in the art to best utilize the invention.

Figure 1:
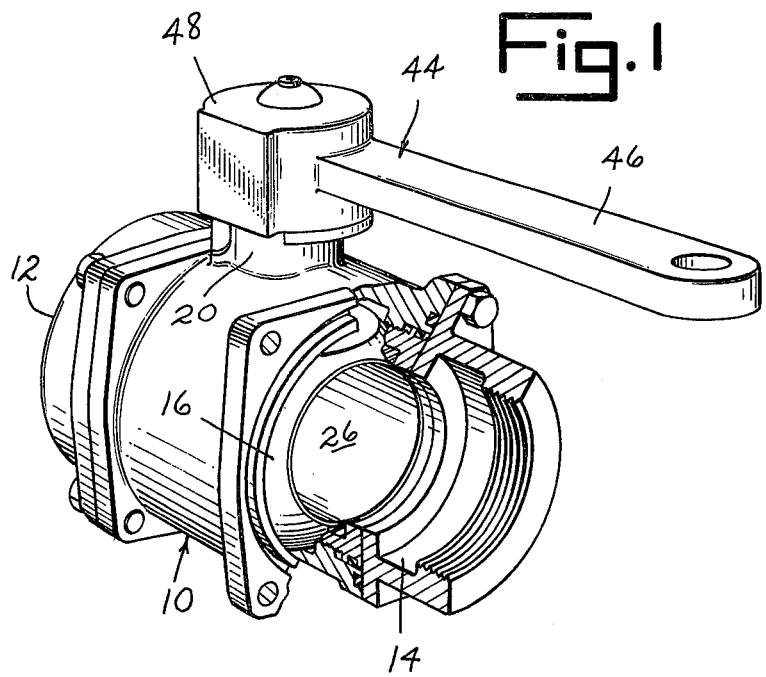
FIG. 1 is a perspective view of the valve with portions of the valve housing broken away for purposes of illustration.
Figure 2:
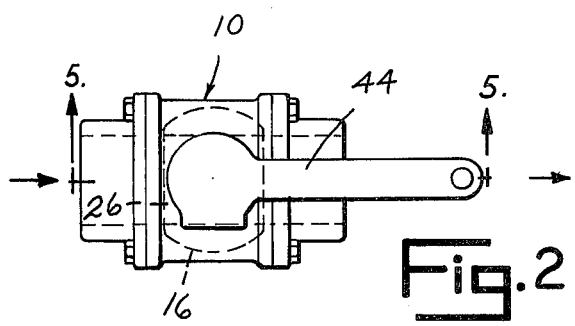
FIG. 2 is a view of the valve in its full open position as seen from above in FIG. 1.
Figure 3:
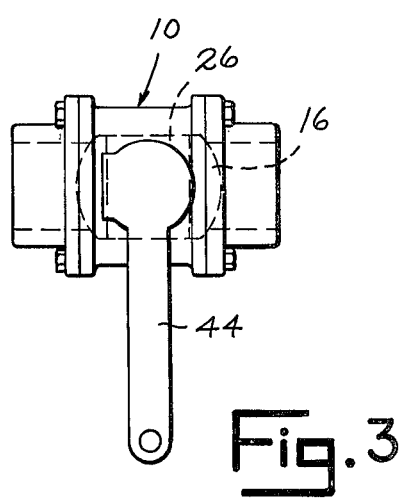
FIG. 3 is a view of the valve in its closed position as seen from above in FIG. 1.
Figure 5:
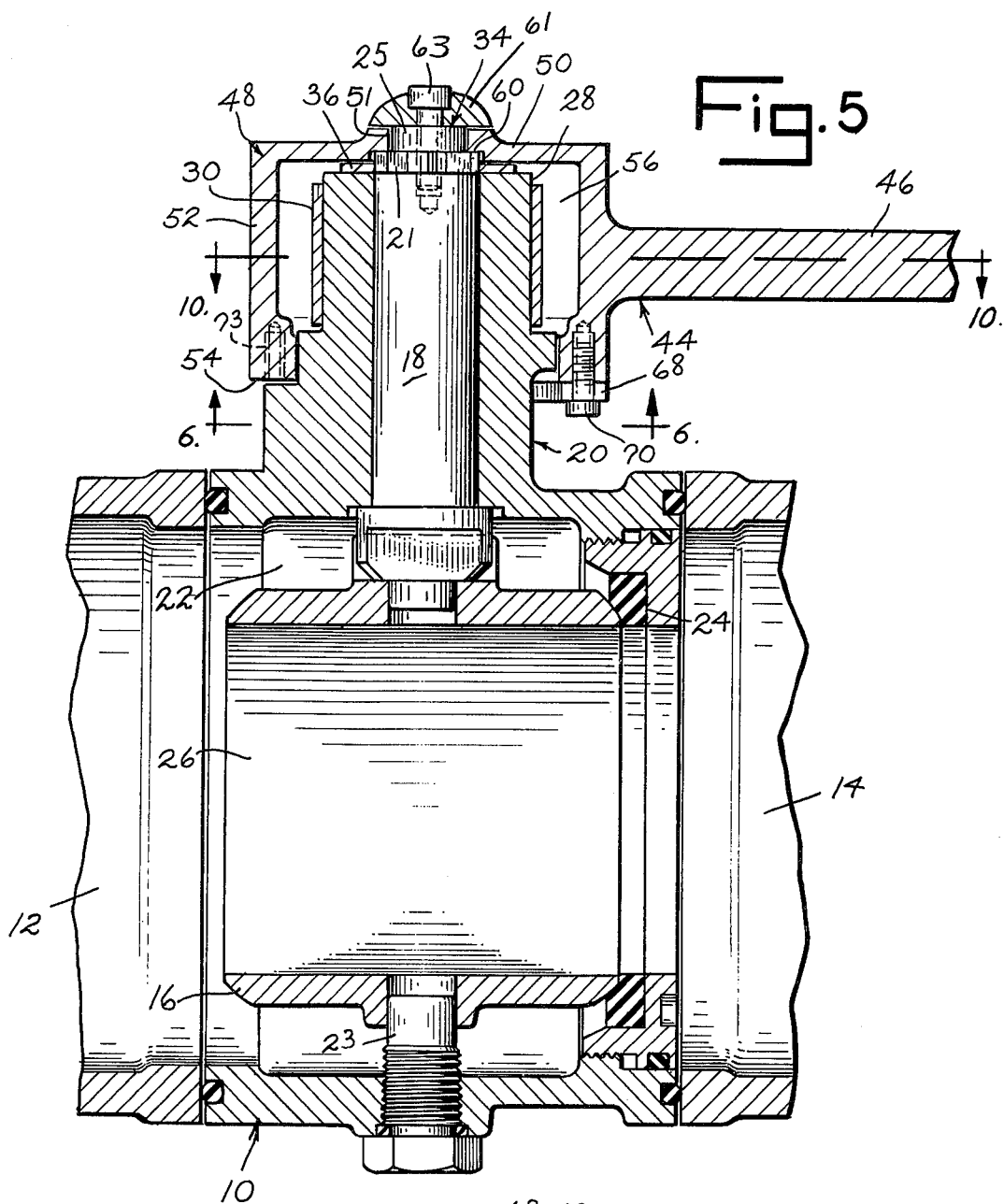
FIG. 5 is a longitudinal sectional view of the valve taken along line 5—5 of FIG. 2.
Figure 6:
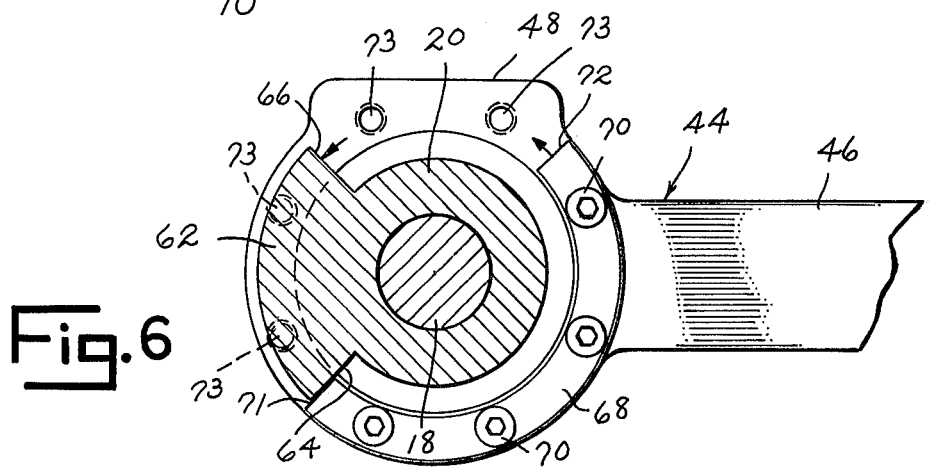
FIG. 6 is a sectional view taken along line 6—6 of FIG. 5.

The valve depicted as the preferred embodiment is a ball valve and includes a housing 10 having an inlet 12 and an outlet 14. A rotative closure member or ball 16 is carried within housing 10 between inlet 12 and outlet 14. A stem 18 is journaled within a hub 20 forming a part of housing 10. Stem 18 protrudes into chamber 22 of housing 10 and is connected to ball 16. A pin 23 is located in housing 10 oppositely of stem 18 and cooperates with the stem to support ball 16 for its rotative movement. A ring seal 24 is positioned at inlet 12 of housing 10 so as to contact ball 16. Rotation of stem 18 causes ball 16 to rotate between a valve open position as shown in FIGS. 1, 2 and 5 in which opening 26 through the ball is aligned with the inlet opening in housing 10, and a valve closed position as shown in FIG. 3 in which the ball is positioned with its uninterrupted surface contacting ring seal 24. The valve thus far described is of a common commercial construction having a manner of operation well known in the art. Additionally, housing 10 is of a three-part construction consisting of a main or center part which carries ball 16 and two threaded detachable end parts which define inlet 12 and outlet 14. This specific construction of the valve is known as a drop-out ball valve.

The inventive features of the above described valve are as follows. Hub 20 of housing 10 is provided with a cylindrical side wall 28 which is substantially coaxial with the axis of rotation of stem 18. A split spring band 30 is fitted constrictively about side wall 28 of hub 20. Band 30 is preferably formed of spring steel, while housing 10 including hub 20 may be formed of a brass material so as to provide for substantial frictional resistance between the band and the hub. The ends of band 30 are formed into out-turned, opposed flanges 32.

Figure 4:
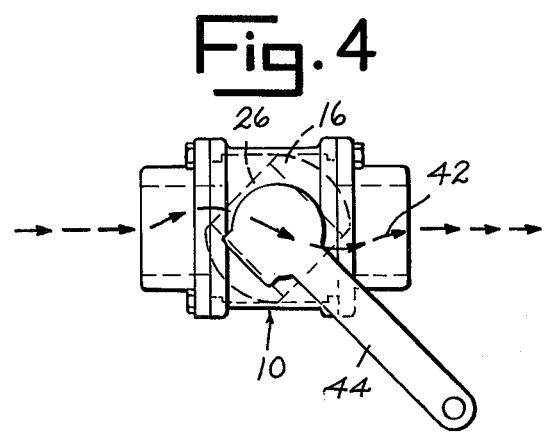
FIG. 4 is a view of the valve in a partially open position as seen from above in FIG. 1.
Figure 10:
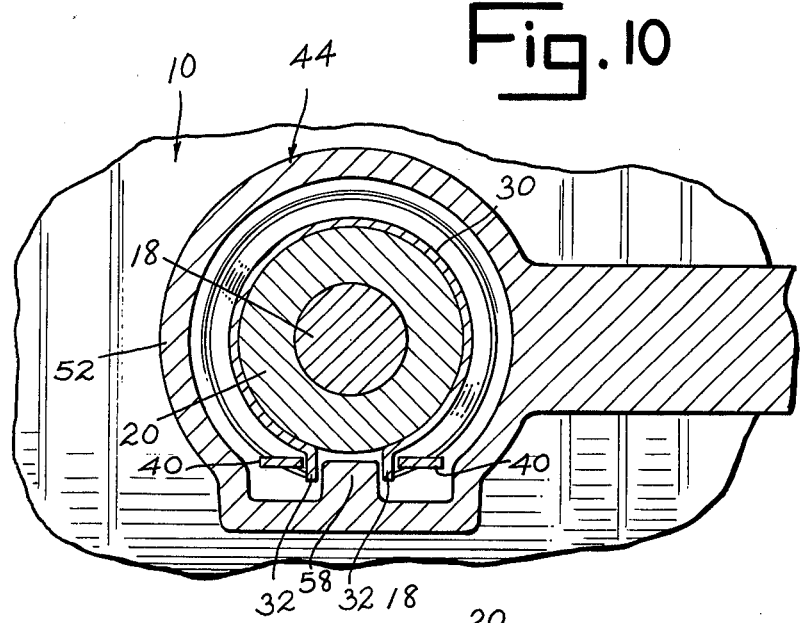
FIG. 10 is a sectional view of the valve as seen along line 10—10 of FIG. 5.
Figure 12:
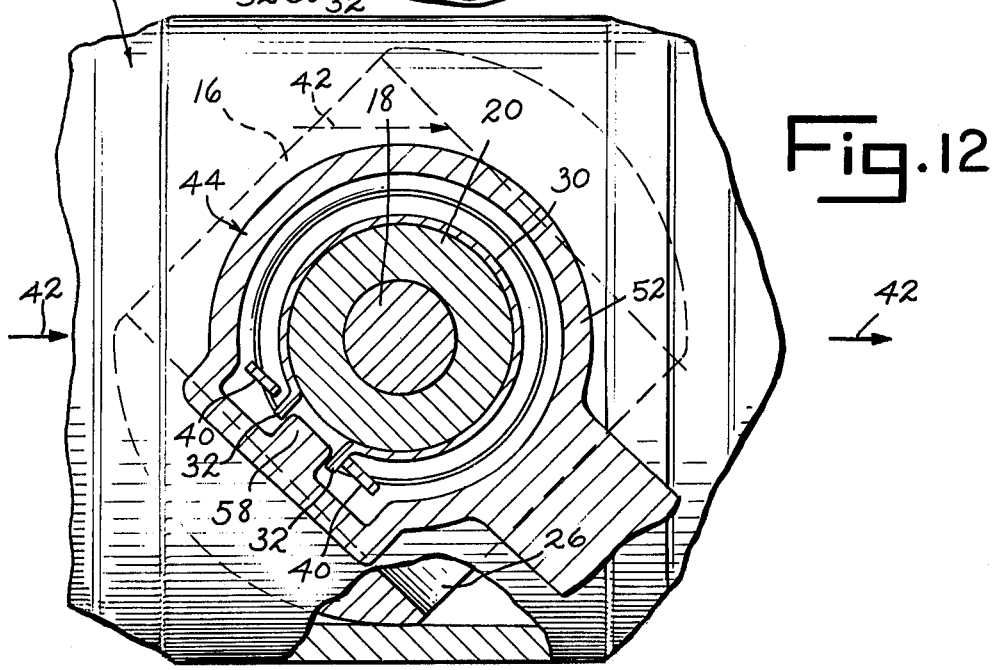
FIG. 12 is a sectional view like that of FIG. 10 but with the valve closure being shown retained in a partially open position during fluid flow through the valve.

The outer end portion 34 of stem 18 projects from the housing hub 20 and is formed with equal-angular radially disposed V-shaped faces 21 and a reduced end 25. A connector 36 having an opening 38 therein which is complemental to the multiple faced end portion 34 of stem 18 is located over the upper end of hub 20. End portion 34 of stem 18 fits into opening 38 of connector 36 to interlock at its faces 21 with the connector. Connector 36, which is preferably formed of steel, includes a pair of spaced downturned tabs 40 which straddle flanges 32 of band 30 with slight clearance, as best shown in FIG. 10. With connector 36 extending between stem 18 and band 30, ball 16 cannot be rotated by the application of a direct turning force such as would be exerted by fluid flow, indicated by arrows 42 in FIGS. 4 and 12, passing through the valve. Such movement is prevented by the contact of one of the tabs 40 of connector 36 with adjacent flange 32 of band 30. In fact, the more pressure which is applied directly to ball 16 to cause its rotation the greater stem 18 will cause connector 36 to bear against the contacted flange 32 of band 30, thereby causing the band at the flange to be forced inwardly into increasing frictional contact with side wall 28 of hub 20.

Selected rotation of ball 16 is effected by handle 44. Handle 44 includes a grip part 46 and a head part 48. Head part 48 includes an end wall 50 and a side wall 52 which terminates in an end edge 54 defining an opening into the interior 56 of the head part. End wall 50 of handle head part 48 has an opening 51 formed in it. Side wall 52 of handle head part 48 includes a projection 58 which is located within the interior 56 of the head part. Like housing 10, handle 44 may be formed of brass. Handle head part 48 is fitted over hub 20 with its projection 58 fitting with slight clearance between flanges 32 of band 30, as shown in FIG. 10. End wall 50 of handle head part 48 also includes an internal recess 60 at opening 51. End portion 34 of stem 18 at its faces 21 projects with clearance into handle recess 60, and stem reduced end 25 extends with clearance through handle opening 51. A washer part 61 is located over opening 51 and rests against the end face of stem reduced end 25. A screw 63 extends through washer part 61 and is threaded into end portion 34 of stem 18 to connect washer part 61 to the stem. The length of stem reduced end 25 exceeds the thickness of end wall 50 of handle head part 48 about opening 51, thereby providing clearance for handle 44 between stem 18 at faces 21 and washer part 61 and thus allowing the handle to turn or rotate relative to the stem.

Figure 11:
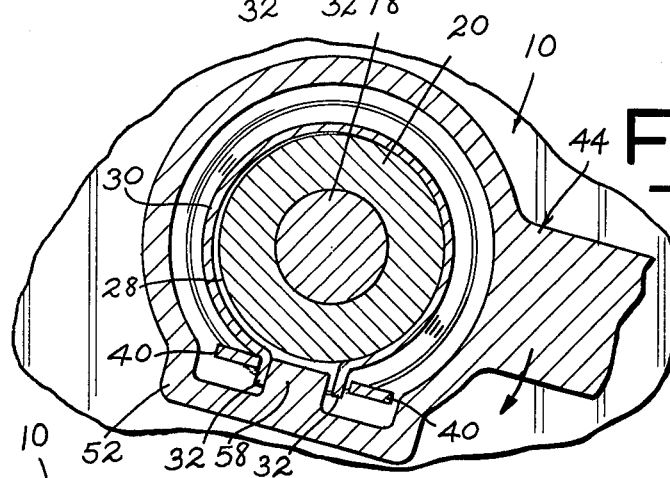
FIG. 11 is a sectional view like that of FIG. 10 but with the handle of the valve being rotated to position the valve closure in a partially open position.

To rotate ball 16 for the purpose of opening and closing the valve, handle 44 is rotated by its grip part 46 to cause its projection 58 to bear forceably against a flange 32 of band 30. This causes a portion of the band to be sprung away from side wall 28 of hub 20, as shown in FIG. 11, thereby reducing the frictional resistance between the band and the hub to allow rotation of the band about the hub with handle 44. As band 30 begins to turn about hub 20, its flange 32 which is contacting projection 58 of the handle is urged against a tab 40 of connector 36 to cause the connector to rotate with the band. As connector 36 rotates about hub 20, it simultaneously causes connected stem 18 to rotate, which in turn also causes ball 16 to rotate between its valve open and closed positions.

Although clockwise rotation of handle 44 is shown in FIg. 11 and aforedescribed, it is to be understood that the handle may also be rotated in a counterclockwise direction which would cause its projection 58 to engage the opposite band flange 32 to reduce the constrictive force of band 30 about hub 20 and to urge such flange into contact with the adjacent connector tab 40 to rotate the stem and connected ball 16 in a counterclockwise direction. As previously discussed, rotation of ball 16 by only the application of a fluid force upon the ball is prevented by contact of one of the tabs 40 of connector 36 with the adjacent flange 32 of band 30.

A stop 62 having angularly disposed faces 64 and 66 is formed in side wall 28 of housing hub 20. A crescent or sector-shaped contact 68 is connected by screws 70 to end edge 54 of handle head part 48. Contact 68 includes end faces 71 and 72 which are in substantially the same plane as faces 64 and 66 of stop 62 so that the contact engages the stop upon rotation of handle 44. At one extreme position of the handle 44 contact face 71 will abut stop face 64; at the opposite extreme position of the handle contact face 72 will abut stop face 66. In this manner the maximum swing or degree of rotation of the valve handle 44 is regulated. In the valve construction shown the length of contact 68 in relationship to the width of stop 62 allows handle 44 to rotate through 90 degrees. This permits ball 16 to be pivoted or shifted between a closed position and a full opened position and to be stopped at any intermediate open position therebetween. End edge 54 of handle head part 48 is provided with a plurality of equal angularly spaced threaded bores 73 which are adapted to receive screws 70 in securing contact 68 to the handle head part. This angular adjustment of contact 68 provided by bores 73 in conjunction with the multiple faces 21 of stem 18 provides an option to the valve user as to the location of the 90 degree throw of handle 44. Such an option is particularly important when the valve is located in such a position that there is only limited room to accommodate rotation of the handle.

It is to be understood that the invention is not to be limited to the details above given but may be modified within the scope of the appended claims.

What I claim is:

1. In a fluid valve having a housing, said housing having a chamber and an inlet into and an outlet from said chamber with a valve seat therebetween, a valve closure carried within said housing chamber between said inlet and outlet, said housing including a hub part having a bore extending therethrough into said housing chamber, a stem rotatably carried within said hub part bore, one end of said stem associated with said valve closure for shifting the closure between a closed position in fluid sealing contact with said valve seat and an open position allowing fluid communication between said housing inlet and outlet through the valve seat, handle means for shifting said valve closure between its open and closed positions, the improvement comprising connection means locating said handle means adjacent said hub part for rotative movement of the handle means relative to said stem, a lock member carried by said hub part, said lock member having a release position allowing the lock member to shift relative to the hub part and a normal lock position engaging the hub part to secure the lock member against movement relative to the hub part, a connector secured to said stem for rotative movement with the stem, said connector being anchored to said lock member for shiftable movement with the lock member, said handle means contacting said lock member for urging the lock member into its release position upon rotation of the handle means and causing said lock member and connector to shift as a unit to rotate said stem and shift said valve closure between its open and closed positions.

2. The valve of claim 1 wherein said hub part includes a side wall, said lock member including a split flexible band constrictively fitting about said side wall and having spaced opposed ends, said handle means including a protrusion fitting between said band ends, said protrusion constituting means for engaging said band ends upon rotation of the handle means to flex at least a portion of the band away from said hub part side wall to allow rotation of the band about said hub part.

3. The valve of claim 2 wherein said band ends are formed into opposed flanges, said handle means protrusion positioned between said flanges, said connector including spaced tabs, said band flanges located between said connector spaced tabs, said handle means protrusion engaging one of said band flanges to urge said band portion away from said hub part side wall upon handle means rotation, said one band flange constituting means engaging one of said connector tabs to move said connector with said band and effect rotation of said stem.

4. The valve of claim 3 wherein each connector tab constitutes means for engaging a said band flange upon a fluid pressure force being exerted upon said valve closure and urging said band at its last mentioned flange into increased frictional engagement with said hub part side wall to prevent shiftable movement of the valve closure within said housing chamber.

5. The valve of claim 4 wherein said stem at its opposite end is multiple sided, said connector having a complementary multiple sided opening for interlocking with said stem at multiple selected angular positions.

6. The valve of claim 5 wherein said handle connection means connects said handle means to said opposite stem end for rotation of the handle means relative to the stem.

7. The valve of claim 2 wherein said housing includes a stop located adjacent said hub part, said handle means carrying a sectored part having angularly disposed end faces positioned in the plane of said stop, each of said end faces being engageable with said stop during handle means rotation to define rotative limits for said handle means.

8. The valve of claim 7 and means for detachably connecting said sectored part to said handle means for varying the angular location of said handle means rotative limits.

9. In a ball valve having a housing, said housing having a chamber and an inlet into and an outlet from said chamber with a valve seat therebetween, a valve closure carried within said housing chamber between said inlet and outlet, said housing including a hub part including a bore extending therethrough into said housing chamber, a stem rotatably carried within said hub part bore, one end of said stem connected to said valve closure for rotating the closure between a closed position in fluid sealing contact with said valve seat and an open position allowing fluid communication between said housing inlet and outlet through said valve seat, handle means including a grip part and a head part, means for connecting said handle means at its head part to said stem for imparting rotational movement to said stem, the improvement wherein said housing hub part includes an exterior stop having first and second displaced end faces, said handle means head part including an exterior end edge spaced from said housing, a sectored part carried by said end edge of the handle means head part and including displaced first and second end faces, said sectored part end faces being located in the same general plane as the end faces of said stop during rotation of said handle means, said sectioned part being shiftable over said end edge to vary the location of its end faces relative to the end faces of said stop, said first sectored part end face engaging said first stop end face to define one rotative limit position of said handle means and said second sectored part end face engaging said second stop end face to define a second rotative limit position of the handle means, and means for adjustably securing said sectored part to said end edge of the handle means head part so as to allow movement of the sectored part relative to the end edge to angularly vary the limit positions of said handle means relative to said valve housing.

* * * * *